Dec. 22, 1925.
A. A. BAYER
1,566,812
ARTIFICIAL BAIT
Filed May 25, 1925
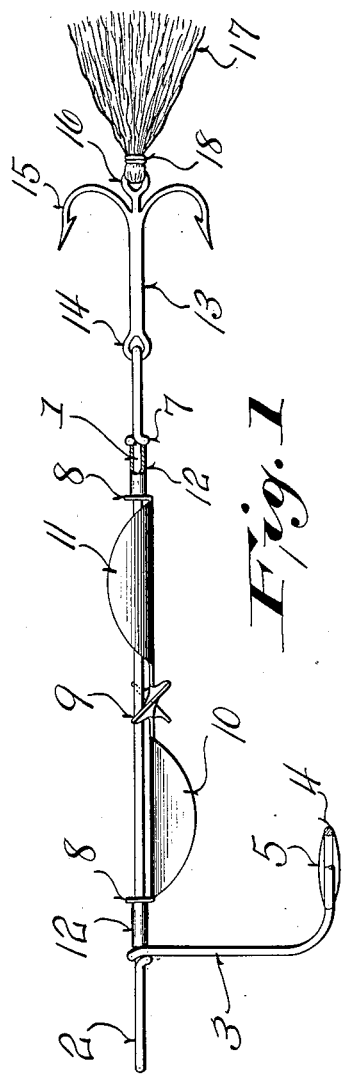
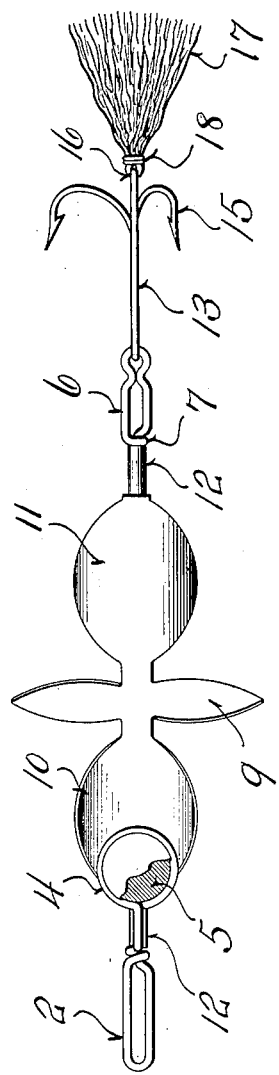

Patented Dec. 22, 1925.

1,566,812

UNITED STATES PATENT OFFICE.

ALBERT A. BAYER, OF MILWAUKEE, WISCONSIN.

ARTIFICIAL BAIT.

Application filed May 25, 1925. Serial No. 32,708.

*To all whom it may concern:*

Be it known that I, ALBERT A. BAYER, a citizen of the United States, and resident of Milwaukee, in the county of Milwaukee and State of Wisconsin, have invented certain new and useful Improvements in Artificial Baits; and I do hereby declare that the following is a full, clear, and exact description thereof.

This invention relates to artificial baits.

Objects of this invention are to provide an artificial bait which is equipped with a spinner or movable member so constructed that it will spin when the bait is drawn through the water at any speed above a predetermined speed, and which, when slowly drawn through the water, will oscillate from side to side.

Further objects are to provide an artificial bait which has a weighted offset portion to prevent twisting of the line and avoiding the use of a swivel, and which is so constructed that it operates as a very efficient weed or obstruction guard and causes the bait to ride freely over any obstruction without tangling.

Further objects are to provide an artificial bait which is of very simple construction and may be cheaply manufactured, and which is provided with a lure receiving eyelet at its rear end adjacent the hooks to which any suitable type of lure may be attached.

An embodiment of the invention is shown in the accompanying drawing, in which:—

Figure 1 is a side view of the device.

Figure 2 is a view from the under side of the structure shown in Figure 1.

The bait comprises a central spindle 1 formed of a piece of non-corrosive wire. This spindle has an eyelet twisted at its forward end, as indicated at 2 to receive the line and has its forward end extending downwardly substantially at right angles to its body portion, as indicated at 3, to provide a weight and obstruction guard. This arm 3 has its outer arm bent backwardly and formed into a ring 4. A lead weight 5 is positioned within the ring and slightly flattened and is thus securely retained in place. A convenient way of making this portion of the device is to use an ordinary lead buckshot which is put within the ring 4 and compressed into the form shown in Figure 1, thus shaping itself to the contour of the ring and also gripping around a portion of the sides of the wire forming the ring.

The spindle 1 extends rearwardly and is formed into a rear loop 6. Its extreme end is twisted about the main shank of the spindle, as indicated at 7.

The spinner is formed from a sheet metal blank and is provided with a pair of upturned lugs 8 which are apertured and freely rotate upon the spindle 1. It is provided with a propeller 9 preferably approximately centrally and is provided with a pair of forwardly positioned rounded arms 10 and with a pair of similar rearwardly positioned rounded arms 11. From reference to the drawing, it will be seen that both of the arms 10 are turned outwardly in the same direction and that both of the arms 11 are turned inwardly. A pair of small spacing sleeves 12 are positioned upon the spindle upon the outer side of the lugs 8, as shown, to form substantially frictionless stops for the lugs.

The hook comprises a main shank portion 13 provided with an eyelet 14 freely interlinked with the eyelet 6. A plurality of regularly spaced hooks 15 extend outwardly from the shank, and it is to be noted particularly from Figure 1, that an eyelet member 16 extends rearwardly from the common point of the multiple hooks. This eyelet member is adapted to receive a lure of any suitable kind. This lure, as shown in the drawings, may consist of a tassel-like portion 17 threaded through the eyelet 16 and wrapped, as indicated at 18, to retain it in position, although obviously, any suitable type of lure may be employed.

In using the device, it may be noted that the weight 5 will be positioned downwardly by means of the guard arm 3 and will prevent the spindle from rotating and consequently prevent twisting of the line. Further, when weeds are encountered by the arm 3, they are gradually forced downwardly and the device rides over the weeds in a free and unobstructed manner. Also this guard 3 will permit ready riding of the device over stumps, stones or other obstructions. When this device is drawn through the water over a speed of a predetermined value, the spinner will rotate. However, if the device is drawn through the water at a rate below a predetermined speed, it has been found by actual practice that the spinner will oscillate from side to side as the arms 10 and 11 oppose free rotary motion towards which the device is urged by the propeller 9. This oscillatory motion at low speed, however, gives the necessary life-like appearance to the bait.

It will thus be seen that an artificial bait has been provided which will be life-like in its operation both at a high and at a low speed and at all intermediate speeds.

It will be seen further that the device is substantially a weed free bait and will ride over obstructions in a very effective manner.

Although the invention has been described in considerable detail, it is to be understood that the invention may be variously embodied and is, therefore, to be limited only as claimed.

I claim:

1. An artificial bait comprising a spindle having a line receiving eye at one end, and a hook receiving eye at its other, an arm extending downwardly from adjacent the first mentioned end of said spindle and having a rearwardly bent weighted portion, a spinner revolubly mounted upon said spindle and having a pair of forward arms, and a pair of rearward arms curved in opposite directions, and a propeller between said pair of arms, and a movable hook interlinked with said last mentioned eye.

2. An artificial bait comprising a spindle formed of an elongated piece of wire, said wire having its rear end formed into a hook receiving eyelet and being twisted about the shank of the spindle and having its forward end twisted about said shank to form a line receiving eyelet with the forward end of the wire projecting downwardly and inwardly and formed into an eyelet at its rearmost end, a weight carried by said last mentioned eyelet, a multiple hook connected with the rear eyelet of said spindle, and a spinner formed from a single blank of sheet metal and having a pair of apertured ears revolubly mounted on said spindle and projecting from the same side of said spinner, said spinner having a pair of forward arms and a pair of rear arms with the forward pair of arms curved in one direction, and the rear pair of arms curved in the other direction and having a propeller intermediate said arms.

3. An artificial bait comprising a spindle having a line receiving eye at one end, and a hook receiving eye at its other end, an arm extending downwardly from adjacent the first mentioned end of said spindle and having a rearwardly bent weighted portion, a spinner revolubly mounted upon said spindle and having a pair of outwardly projecting arms, a propeller integral with such arms, and a movable hook interlinked with said last mentioned eye.

In testimony that I claim the foregoing I have hereunto set my hand at Milwaukee, in the county of Milwaukee and State of Wisconsin.

ALBERT A. BAYER.